Dec. 4, 1951    P. H. FASSNACHT    2,577,116
JIG FOR MILLING

Filed Sept. 16, 1944    6 Sheets-Sheet 1

INVENTOR.
PAUL H. FASSNACHT.
BY Ward Crosby Neal
his ATTORNEYS.

Dec. 4, 1951  P. H. FASSNACHT  2,577,116
JIG FOR MILLING
Filed Sept. 16, 1944  6 Sheets-Sheet 2

INVENTOR.
PAUL H. FASSNACHT.
BY
his ATTORNEYS.

Dec. 4, 1951 P. H. FASSNACHT 2,577,116
JIG FOR MILLING
Filed Sept. 16, 1944 6 Sheets-Sheet 3

INVENTOR.
PAUL H. FASSNACHT.
BY
his ATTORNEYS.

Patented Dec. 4, 1951

2,577,116

UNITED STATES PATENT OFFICE 2,577,116

JIG FOR MILLING

Paul H. Fassnacht, West Nyack, N. Y., assignor to Precision Shapes, Inc., Suffern, N. Y., a corporation of New York Application September 16, 1944, Serial No. 554,386

4 Claims. (Cl. 90—59)

This invention relates to a jig which is shown in combination with the apparatus of my copending application Serial No. 491,157, filed June 17, 1943, Patent No. 2,436,960, issued March 2, 1948, of which the present application is a continuation-in-part. It shall be understood, however, that the jig herein described and claimed may be used with other apparatus and employed in other processes than the apparatus and process described in my said copending application and, accordingly, is not restricted to combination therewith.

In my said copending application, I have described and claimed the milling apparatus as a whole, including the jig, and also the process of milling. In the present application, I describe and claim not only the jigs shown in said copending application, but also certain other modified jigs.

The principal object of the invention is to provide a simple, efficient apparatus of the kind described, employed in connection with cutting metal or other material to dimensions of low tolerances.

The invention accordingly comprises the novel apparatus and combinations thereof, specific embodiments of which are described herein by way of example only and in accordance with the manner in which I now prefer to practice the invention.

In carrying out the process of the invention, the metal or other material in the form of flat or otherwise shaped strips to be cut, are clamped at or near their ends and drawn through a support enclosing and grasping the surfaces of the metal to be cut under tension. In the case of flat, rectangular strips, the top, bottom and two sides are usually grasped and held under tension. While being drawn through the support, they are cut by cutting devices engaging them through orifices in the support and while the strips are traveling past the orifices.

In the accompanying drawings I have shown embodiments of my invention as I now prefer to practice it. In these drawings.

Figure 1:
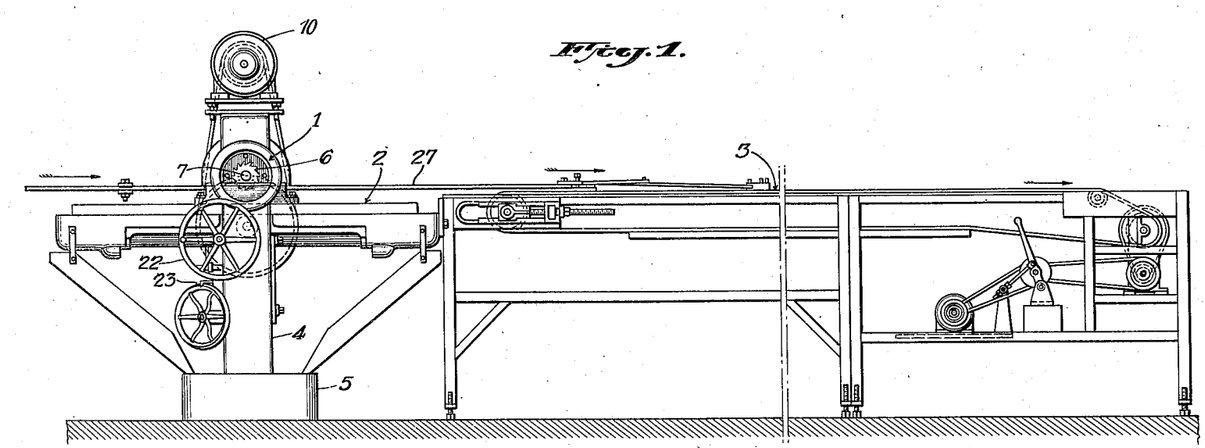
Figure 1 is a side elevation of the whole apparatus, including the jig, with a portion of the chain and chain support removed to permit the showing of both ends of the apparatus in the same figure.

Referring now to the drawings and particularly to Fig. 1, the numeral 1 indicates generally the device for operating the cutters; 2 designates generally the devices for supporting and guiding the strip to be cut, and 3 designates generally the device including chains arranged for attachment to the strip or strips for moving it or them through the support past the cutter to cut the strips.

Figures 3, 5:
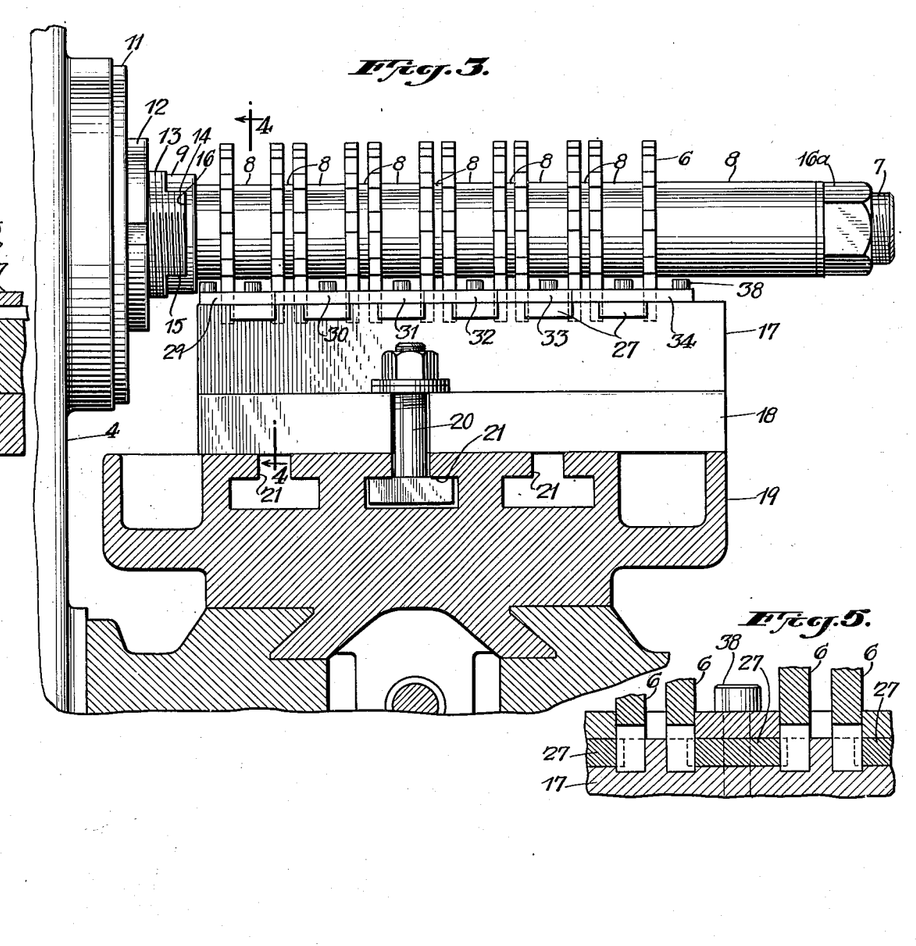
Fig. 3 is an enlarged fragmentary partial section showing the mounting of the milling cutters and jig with strips passing through the jig in contact with the cutters.
Fig. 5 is an enlarged fragmentary cross section showing the cutting of three strips.
Figure 4:
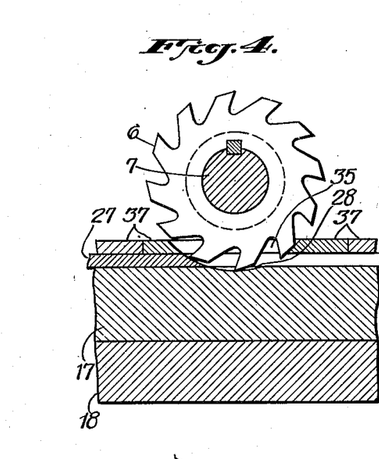
Fig. 4 is a side elevation of one of the cutters partly in section on the line 4—4 of Fig. 3.

As shown more clearly in Figs. 1 and 3, the cutters are mounted on a pedestal 4 supported by a base 5. The cutters 6 are mounted on a shaft or arbor 7 and are spaced apart by intermediate spacers 8 and an end spacer 9. The shaft is driven by the usual motor drive including a motor 10 mounted on the pedestal 4 which, by suitable means, drives the shaft 7. A cover disc 11 holds the internal bearing parts in proper assembly. The disc 11 is held in place by a nut 12 which is in threaded engagement with an enlarged threaded portion 13 of the shaft 7. The portion 13 is provided with two opposite flattened faces 14, 15 which provide right-angled keyways registering with grooved portion 16 of the spacer 9. The forward face of the spacer 9 accurately defines the plane from which the cutters are spaced at precise distances. This face is arranged in exact vertical alignment with the plane of the left face of the jig as shown in Fig. 3. Once these two planes are in alignment, the cutters are then assembled on the arbor by suitable spacers 8 so that they exactly align with the slots in the jig. The cutters and spacers are then secured in place by the nut 16a on the shaft 7.

The cutters are rotated at speeds varying with the kind of material, type of cutting, etc. I have found that speeds of 70 R. P. M. to over 2000 R. P. M., but without limitation, can be employed. The slower speeds are used for tough steels and other tough materials, while the higher speeds are used for brass and other soft materials.

Figure 2:
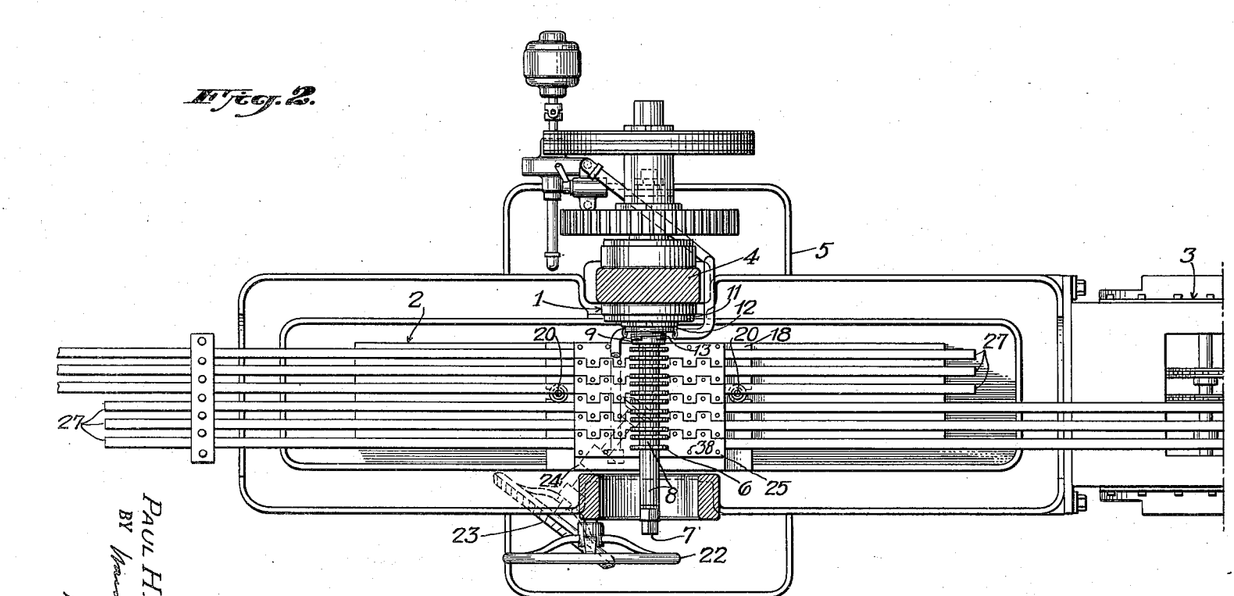
Fig. 2 is an enlarged plan view, partly broken away, showing the left end of the apparatus of Fig. 1.

The work support designated generally as 2 and which will be described below is located directly beneath the cutters 6. It consists as herein shown of a jig or fixture 17 which is mounted on a bed-block 18 attached to a bed 19 by means of a T-headed bolt and nut 20 located and projecting through the slots at either end of the bed-block 18 and with the T-head of the bolt seated in one of the T-shaped recesses 21 in the bed. The bed is adjustable to the right and left longitudinally of the work as shown in Fig. 2 through conventional means operated by the handwheel 22. The bed may be adjusted up and down by convention means operated by the handwheel 23 which has a device for indicating the setting.

Coolant is supplied to the work and cutters from a tank located in the base 5 of the apparatus. This is circulated by suitable means so that it is delivered through nozzles situated above the cutters. After spraying onto the cutters and work to control the temperature, the coolant plus particles of cut metal passes back to the tank being filtered enroute.

Figure 6:
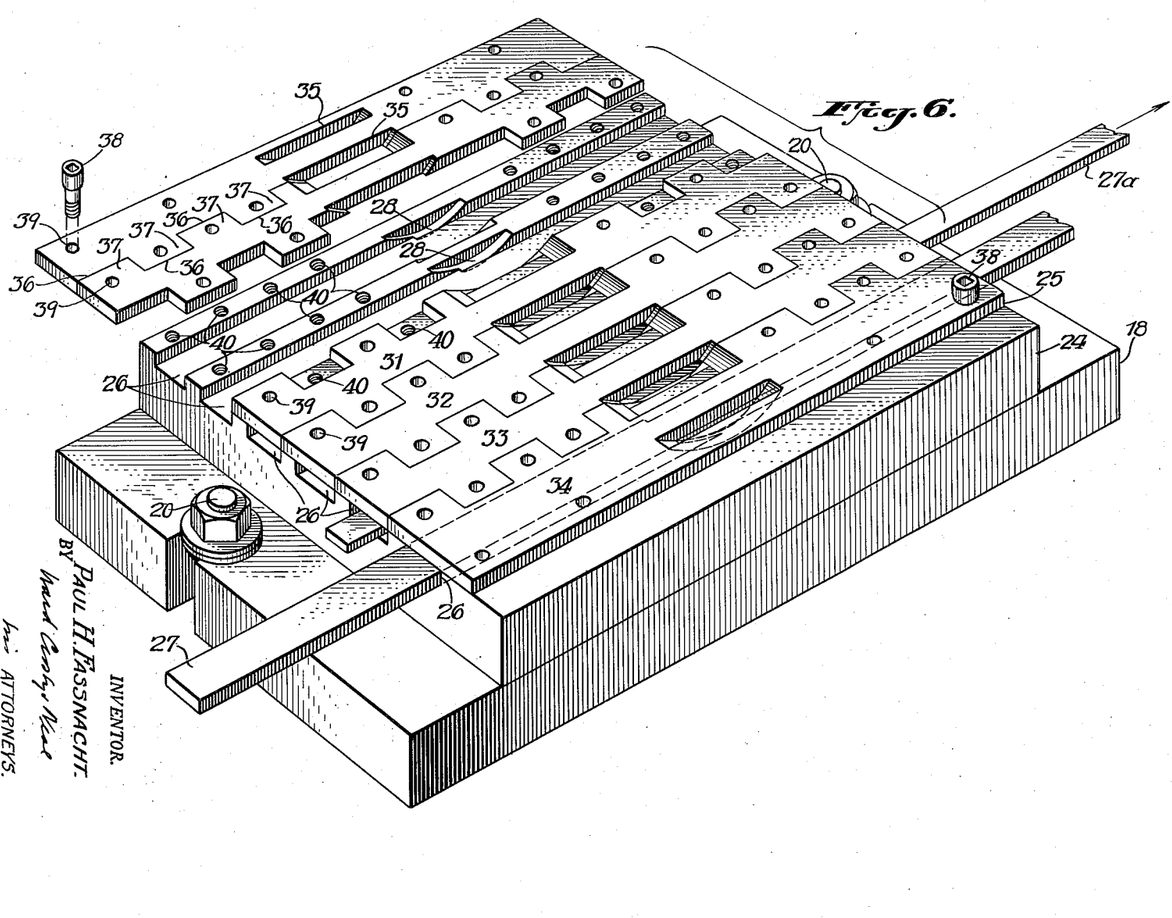
Fig. 6 is a perspective view showing the jig assembly having a plurality of substantially parallel channels, with one strip clamped therein and on the left showing a part of the segmental cover plate disassembled.

As shown more clearly in Fig. 6, the jig for supporting and guiding the work includes the bed-block 18 to which is attached the base 24 of the jig and the upper or cover plate 25. The base has a series of six parallel grooves of rectangular cross-section at the top thereof designated as 26 for guiding and supporting the six strips passing therethrough, here shown as bars or strips of metal 27. The number of strips may be decreased or increased. This metal is guided through the jig under tension as described below. The groove 26 has, about midway its length, two opposite arcuate slots 28 in its side walls for receiving the lower-most portions of the cutters 6 when they are operating on the work. The upper plate 25 consists of a series of interlocking segments 29, 30, 31, 32, 33, 34. When these segments are assembled and attached in place, they constitute the cover plate 25 and they cover the base 24 of the jig when in position. The segments as shown are provided with slots 35 which correspond to and are positioned above the slots 28 in the side walls of the grooves. The cutters 6 pass through the slots 35 and 28 into cutting engagement with the metal strips. The end segments 29 and 34 each has one edge provided with alternate rectangular recesses 36 and alternate rectangular projections 37. The intermediate segments 30—33 have such alternate recesses and projections on their opposite longitudinal edges, the recess of one edge being opposite the projection on the other edge of each. When the segments are assembled, they interlock as shown, the projections 37 fitting into the recesses 36 throughout. The segments are normally held in place by screw-threaded tap screws 38 passing through apertures 39 in the segments of the cover plate and into tapped holes 40 passing through the upper faces of the walls of the grooves 26. The tap screws 38 for the outer segment 29 pass into the holes 40 for holding the extreme left edge of the segment 29, as shown in Fig. 3. The next row of tap screws 38 are also aligned and pass into the aligned holes 40 situated in the wall dividing the first and second channels from the left in Fig. 3, but it will be noted that these successive tap screws pass alternately into the segment 30 near its left edge in the figure and then into the segment 29 on its right edge. The interlocking arrangement thus lessens the number of points at which the segments are attached to the channel walls and yet gives sufficient strength for the purpose intended.

Figure 7:
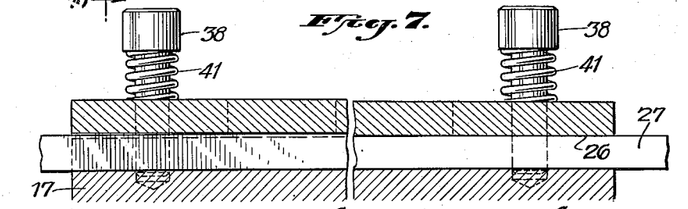
Fig. 7 is a fragmentary view showing the upper cover and lower base of the jig of Fig. 6, held together by bolts with springs.
Figure 8:
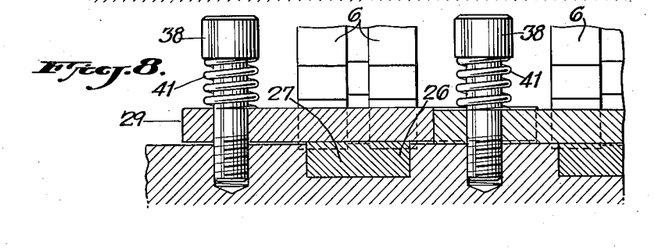
Fig. 8 shows a fragment of the jig with strips of varying heights passing therethrough and showing the action of the spring-held bolts to compensate therefor.

The upper plate when bolted in place on the base normally covers the grooves or channels, as shown, whereby the work 27 closely fits the grooves so that when the work is in place in these grooves and drawn therethrough, it passes through slowly under considerable tension due to the grasping of the strips by the enclosing channel walls formed by the grooves and cover. This means that the upper and lower plates of the jig are selected so that the dimensions of the grooves correspond to that of the work being treated, the dimensions being so close that the work 27 must be forcibly passed through the channels 26. In Fig. 6, I have shown grooves and work which correspond substantially in all dimensions, but I have devised a means as described below for taking care of work whose dimensions do not correspond exactly with those of the jig (one example of which is shown in Figs. 7 and 8). Thus, in Fig. 6 the exit portion of the channel is smaller than the entrance portion of the channel and the strip 27 closely fits the entrance portion before the cut and the cut strip closely fits the exit portion after being cut. The provision of a smaller exit portion further insures against any deflection of the strip from its path of movement.

Figs. 7 and 8 show screws 38 holding segments of the cover plate resiliently in place by springs 41. As there shown, work 27 has a greater thickness than the depth of the grooves 26. In order to insure proper tension on the work as it is pulled through the grooves under these circumstances, the cover plate, as shown, is held in place by the springs 41 cooperating with the screws 38. The springs should be carefully tested so that they exert approximately the same pressure so that upon assembling the cover segments, they will be held in place to give the desired tension in the work. The desired tension may be determined both with and without the springs empirically as discussed below. In Fig. 7 at the left, the strip 27 is shown as of oversize thickness and prior to being cut, with the spring 41 exerting the proper pressure on one of the cover segments 29—34, while at the right the strip is shown as having been reduced in thickness by cutting so that it is of substantially the same depth as the groove 26. The spring 41 and screw 38 at the right of the figure are holding this cut portion of the strip in place under proper tension. In Fig. 8 on the left is shown a strip of oversize thickness and on the right a strip of substantially the same thickness as the groove, passing through the jig simultaneously and both held in place by the tension of the springs 41 cooperating with screws 38. In other words, some or all of the strips passing through may be oversize but are properly held by the springs 41 and tap screws 38.

The strips may be cut in practically any desired manner. Different types of cutting are shown in the drawings. For example, in Figs. 3 and 5, the strip is being reduced in width by the cutters 6 by cutting portions from each longitudinal edge of the strip. The result of such cutting is shown in Fig. 6. The right end of the work is of narrower dimension than the left end and in the center is an arc-shaped cut showing the path made by the milling cutters 6 in removing the longitudinal edges of the strip. In Fig. 8, cutters 6 are shown forming a central rib on the upper face of the strip 27.

Figure 9:
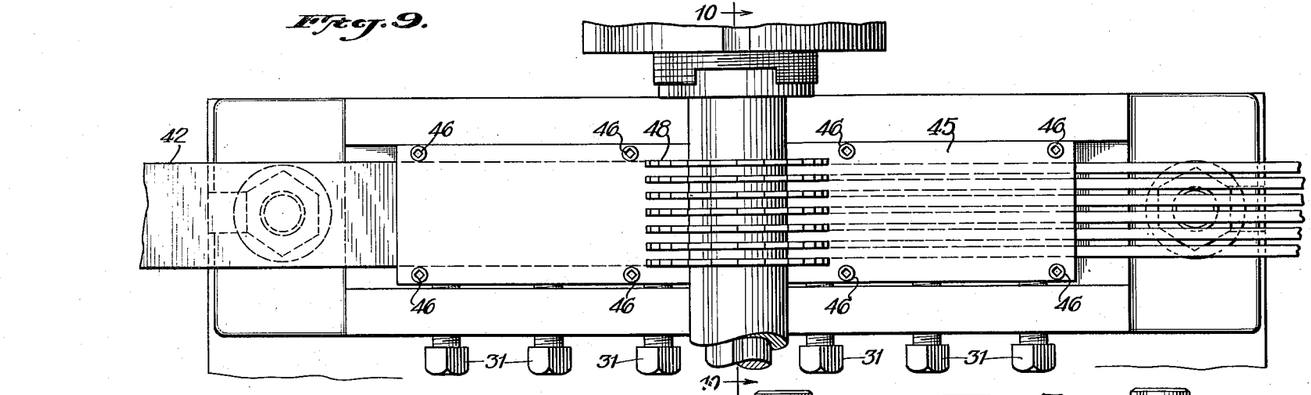
Fig. 9 is a modification showing a plan view of milling cutters mounted to cut narrow strips from a single strip and with a special modified jig mounted on the bed-plate.
Figure 10:
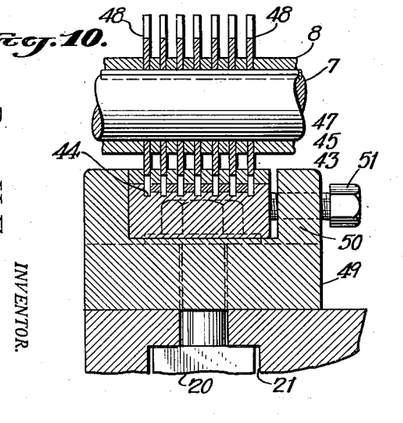
Fig. 10 is a cross section on the line 10—10 of Fig. 9.

I may also cut a broad strip such as is shown at 42 in Figs. 9 and 10 into a series of narrow strips. For this purpose, I provide a somewhat different type of jig and cutter, as shown in Figs. 9 and 10. The metal strip 42 passes through a jig which consists of a long narrow lower plate or base 43 having a groove 44 which is of substantially the same dimensions with respect to width and thickness as the strip to be cut. Over this lower plate is a cover plate 45 which is preferably made in one piece and attached to the lower plate by screws 46. Approximately in the center it is grooved as at 47 to receive a series of milling cutters 48 keyed to the shaft 7. The jig is mounted on a base 49 being seated in a rectangular jaw 50 in the upper face thereof and held in place by a series of screw-threaded bolts 51. The base 49 is in turn held in place by the T-bolt 20 seated in one of the T-slots 21. As indicated in Fig. 3, there is space for three of these narrow base and jig assemblies to be mounted on the bed 19.

The adjustment of the strip 42 can be made as heretofore indicated and when properly positioned, the strip 42 may be cut into a series of smaller strips, shown in Fig. 9 as being cut into six smaller strips.

As above stated, on the right in Fig. 1, 3 designates the means arranged for attachment to the strip 27 for moving it through the jig 17 past the cutters 6 to cut this strip. This includes one or more endless chains. One or more of the chains are provided with clamping members, one end of which is arranged to be detachably held by the chain links and the other end being attached to one or more of the metal bars or strips 27.

The speed of the chains will vary in accordance with the kind of material to be cut, the shape and finish desired, etc. I have found that the speed of the chain for tough materials where considerable metal is removed may be as slow as two feet per hour. With different material to be cut and smaller quantities removed, the speeds will vary up to 80 feet and more per hours.

Referring now to Figs. 11–15, there is shown a special jig for cutting cylindrical or square bars or strips. Although these figures show the cutting of a cylindrical or square bar, it will be understood that the bars may be of other shape or shapes requiring similar support during the cutting operation to that herein shown and described.

Figures 11, 12, 14, 15:
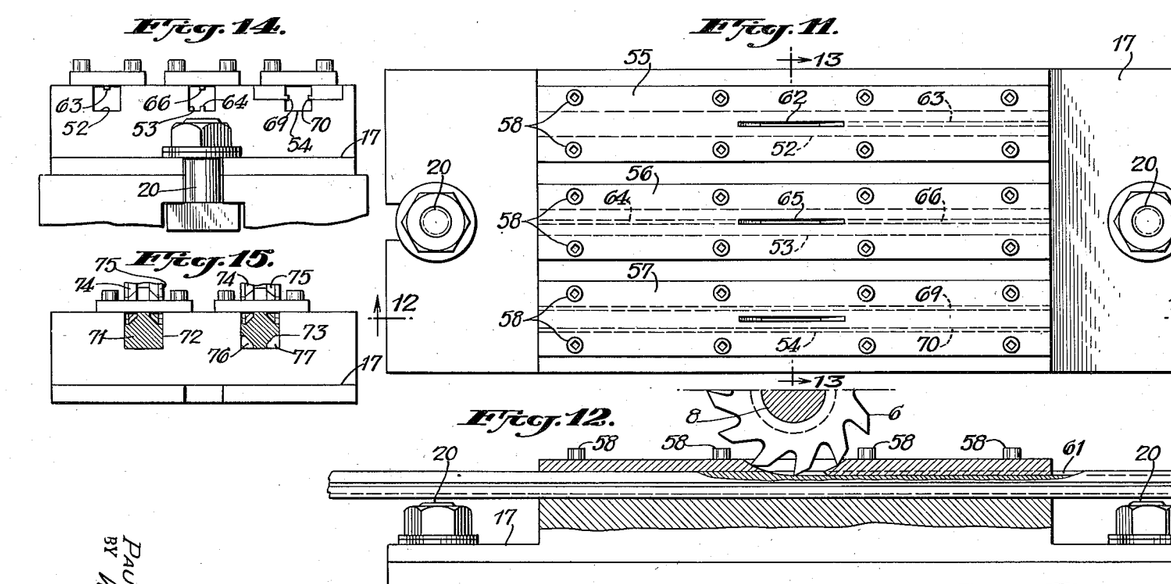
Fig. 11 shows a plan view of a modified jig for a cylindrical strip or bar, showing in dotted lines guides or fins for holding the bars being cut in three channels.
Fig. 12 shows a longitudinal elevation, partly in section, along the line 12—12 of Fig. 11, showing the cutting of a rounded bar or strip as shown on the extreme right in Fig. 13.
Fig. 14 is an end view in reduced size of Fig. 11, showing the fins on the inside of the channels for projecting into grooves cut in the rounded bars to hold them in position during cutting.
Fig. 15 is a similar view to Fig. 14 showing a rectangular bar being cut in a special pattern. Instead of fins, another type of guide is shown for holding the cut bar on the right in the figure.
Figure 13:
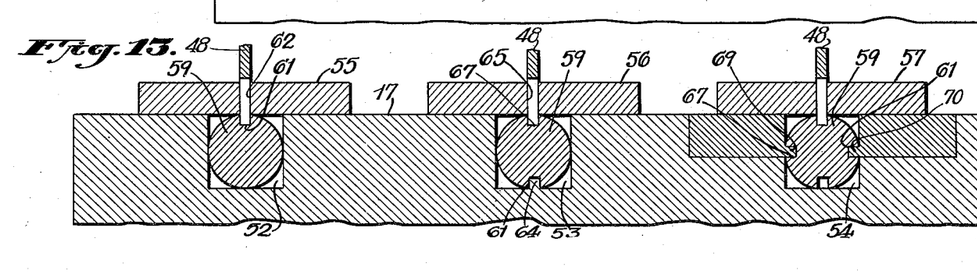
Fig. 13 is a cross section along the line 13—13 of Fig. 11, showing the three stages of cutting bars in the three channels of Fig. 11.

As shown in Figs. 11–14, the jig is arranged to hold a cylindrical bar in which four parallel longitudinal grooves are to be cut, the cylindrical bars being supported and guided during the cutting operation. In Figs. 11 and 13, there are shown three parallel channels 52, 53, and 54 of substantially square cross section. The channels are provided, respectively, with covers 55, 56, and 57, which are held in place on the base of the jig 17 by means of screw-threaded bolts 58. The base is held in place on its support by the bolts 20 in the manner heretofore described for holding the jig in Figs. 3 and 9.

As shown more particularly in Fig. 13, the cylindrical bar or strip is cut to provide four longitudinal parallel grooves which are spaced approximately 90° apart about the circumference of the bar. In making the first cut, the cylindrical bar 59 is grasped by the attachments 3 (Fig. 1) and is drawn through the channel 52. As it reaches the cutter 48, a groove 61 is cut therein by the cutter operating through the aperture 62 in the cover 55 of the channel. Immediately in the rear of the aperture 62 on the underside of the cover (see Fig. 14) is a guide or fin 63 extending rearwardly to the exit end of the channel 52. This fin engages the groove 61 of the strip and guides it as the remainder of the groove is cut in the upper surface of the bar. After passing through the first channel, the bar is turned so that the groove 61 cut therein is on the bottom of the strip. The strip is then introduced into the channel 53 engaging the fin 64 on the bottom floor of the channel 53, which serves to guide the strip as it passes beneath the cutter operating through the aperture 65 in the cover 56 of the second channel. Just to the rear of the rear edge of the aperture 65 is another fin 66 on the underside of the cover 56, which guides the strip by engaging with the groove 67 as it is cut in the upper surface of the strip in the second channel. In other words, as the second groove is cut, the strip is supported top and bottom by the aligned juxtaposed guides or fins 64 and 66. For cutting the third and fourth grooves, the bar after passing through the second channel is placed in the third channel 54 which has two projecting aligned fins 69 and 70 which are juxtaposed, projecting horizontally and longitudinally of the length of the channel. The bar is introduced into this channel so that its grooves 61 and 67 are engaged, respectively, by these guides or fins and the bar is then advanced toward the cutter which cuts the third groove on the top of the bar. In this third channel there is no necessity for a fin to project from the roof or bottom since there is ample support to guide the bar provided by the lateral fins 69 and 70. After the third groove is cut, the bar is turned through 180° and introduced into the third channel, whereupon the fourth groove is cut similarly to the third groove. The result is a circular bar with four parallel longitudinal grooves cut to extremely low tolerances and spaced about 90° about the periphery of the bar.

In Fig. 15, a bar 71 of substantially square cross section fitting in correspondingly shaped channels 72 and 73 is shown in the process of cutting. The first cut shown on the left is executed by two cutters 74 and 75 which cut off one edge of the square, each forming a beveled portion. After these cuts have been made, the bar is turned so that the cut beveled portions are facing downwardly and passed into channel 73, where, as shown, two further bevels are cut by a similar operation with cutters 74 and 75. In making this cut in channel 73, the lower beveled portions of the bar are supported by guides 76 and 77 running longitudinally of the channel 73, being triangular in cross section. The apexes of these triangles are in the corners of the rectangular channel. As thus positioned, the base opposite each apex serves to closely contact and support the adjacent beveled portions of the work being cut.

The apparatus as above described is capable of operating on various kinds of metals, including ordinary steels, alloy steels, brass, and other materials having varying degrees of hardness and otherwise more or less difficult to cut. The speed at which the cutting can be performed will depend on various factors, including the toughness of the material, the amount of cutting to be done, etc. The cutting can be carried on with great precision, if desired, producing products that are cut to dimensions having tolerances of .005".

The operation of the machine will be clear from the foregoing description. In practice, assuming that strips are to be cut in the manner shown in Fig. 6, also assuming that the strips are of substantially uniform size and that they correspond substantially to the dimensions of the grooves made by the upper plate 25 and base 24, at the start of the operation, cutters 6 are mounted on the shaft 7 in the position shown in Fig. 3. The mounting of the cutters is such that the cutter on the extreme left of the figure is spaced an exact distance from the member 9 by an intermediate spacer 8. Another intermediate spacer 8 is then placed on the other side of the cutter 6. The next cutter 6 is then placed on the shaft 7 and the cutters and spacers are thus assembled and located in place by the nut 16a.

The jig is then assembled with the upper and lower members bolted in place and is placed on the bed 19 and is fixed in position. The left edge of the first spacer 8 is so arranged that it is in line with the left edge of the jig. With the parts so positioned, the cutters 6 will be in proper position to cut the work passing through the groove 26.

A metal leader strip 27a (see Fig. 6) may then be run through one of the grooves 26, being of a dimension so that it will not be cut as it passes through the groove. The end of this leader strip will be clamped by the device 3 (Fig. 1) for drawing the strips through the jig. The opposite end of the leader 27a is then attached by means of a cross clamp to two adjacent metal bars or strips to be cut as more fully described in said copending application Serial No. 491,157. The motor 10 operating the milling cutters is then started, as well as the pump for supplying the coolant through the coolant sprays. Thereupon the motor operating the chains for drawing the strips through the jig 17 is started and its speed adjusted for the particular type of material being cut. The lead strip 27a pulls the strips attached thereto through the jig under the cutters and the cutting operation is performed on the metal strips. When the two metal strips have emerged on the opposite side of the jig, they are attached to a second clamp on the chain so that they will be pulled directly by this clamp member thereafter. Thereupon other metal strips may be advanced through the jig by clamping them to the strips already passed therethrough and when these additional metal strips have passed through the jig, they may be clamped on the further side of the jig so that all of the strips may thereafter be moved along together by the chains. Instead of using a lead strip 27a as above indicated, other means for advancing the strips through the jig may be employed as described in my said copending application Serial No. 491,157. After the metal strips have been cut by the apparatus as described, the long pieces may be cut transversely into short lengths as required.

In feeding a new strip into the jig shown in Figs. 9 and 10, I may employ a special clamping means which extends from the left in Fig. 9 around to the cut strips on the right in Fig. 9, this clamping means being more particularly described in said copending application Serial No. 491,157. In supplying the new strips to be cut to the form of jig shown in Figs. 11–14, I may employ similar clamping means to those above described. The operation of the machine when employing the jigs in Figs. 9–14 is substantially the same as that described for operation with the jig shown in Fig. 6.

It will be understood that various kinds of metal, plastic, fiber and other materials may be cut by this apparatus continuously to extremely small tolerances. I have successfully cut alloy and other steels, brass, Phosphor bronze, aluminum and aluminum alloys such as Duralumin, magnesium alloys, Lucite and other plastic materials, etc. Various types of milling cutters may be employed, some of which are illustrated in the drawings and various shapes of strips may be produced. The jigs will vary in shape and dimensions of grooves according to the type of cutting desired. After a material has been cut on one side, it may be reversed and cut on the opposite side. Other types of clamping members may be employed than those shown for attachment to the chains.

What I claim as new and desire to secure by Letters Patent is:

1. A jig for guiding strips of metal passing beneath milling cutters for cutting such strips, consisting of a base and a cover plate, said base having a series of parallel channels of rectangular cross section, each having a flat horizontal bottom wall and two vertical side walls and having about midway its length two opposite arcuate recesses in its side walls, said cover plate consisting of a series of interlocking segments covering the channels in the lower plate when in position and forming a flat horizontal roof for each channel, said cover plate having slots therein registering with the arcuate recesses in the base for the purpose of admitting the edges of the milling cutters passing through the slots into contact with the metal strips for cutting said strips, and means to hold said cover segments and base tightly in place so that said channels as covered thereby make a tight fit with metal strips introduced thereinto providing enclosures for such strips so that the strips must be forcibly passed through the channels so that said strips are firmly held while passing beneath said cutters.

2. A jig for guiding strips of metal passing beneath milling cutters for cutting such strips, consisting of a base and a cover plate, said base having a series of parallel channels of rectangular cross section, each having a flat horizontal bottom wall and two vertical side walls and having about midway its length two opposite arcuate recesses in its side walls, said cover plate consisting of a series of interlocking segments covering the channels in the lower plate when in position and forming a flat horizontal roof for each channel, said cover plate having slots therein registering with the arcuate recesses in the base for the purpose of admitting the edges of the milling cutters passing through the slots into contact with the metal strips for cutting said strips, each segment for interlocking having rectangular recesses spaced at intervals therealong into which corresponding projections of an adjacent segment project to interlock therewith, and means to hold said cover segments and base tightly in place so that said channels as covered thereby make a tight fit with metal strips introduced thereinto providing enclosures for such strips so that the strips must be forcibly pulled through the channels under tension so that said strips are firmly held while passing beneath said cutters.

3. A jig for guiding bars or strips of metal passing beneath milling cutters for cutting such strips consisting of, a base and a cover secured thereon, said base having a series of parallel, open-ended, uncovered grooves rectangular in cross section, the side walls being recessed intermediate the ends of the grooves into which recesses the cutters pass in cutting said strips, said cover forming a flat horizontal roof resting over the side walls of each channel and having slots therein to permit said cutters to pass therethrough into contact with the strips being cut.

4. A jig for guiding bar or strip continuously passing beneath a cutter for continuously cutting a surface of such strip consisting of a base and a cover therefor, said base providing an unobstructed, open-ended, uncovered, three-walled guideway traversing the base, the side wall of said guideway being recessed intermediate the ends thereof to receive the cutter, said cover forming the fourth wall bridging the guideway in the base and secured to the top of said base and provided with an aperture therein through which the cutter may pass to cut said strip, said guideway being shaped and dimensioned to engage strip on all sides at the cutter except at said aperture.

PAUL H. FASSNACHT.

REFERENCES CITED

The following references are of record in the file of this patent:

UNITED STATES PATENTS

| Number | Name | Date |
| --- | --- | --- |
| 173,490 | Miller | Feb. 15, 1876 |
| 549,318 | Johnson et al. | Nov. 5, 1895 |
| 574,226 | Smith | Dec. 29, 1896 |
| 694,757 | Larsson | Mar. 4, 1904 |
| 1,141,713 | Johnson | June 1, 1915 |
| 1,478,068 | Selvig | Dec. 18, 1923 |
| 1,602,509 | Six | Oct. 12, 1926 |
| 1,708,442 | Eckersley | Apr. 9, 1929 |
| 1,776,537 | Booth | Sept. 23, 1930 |
| 1,881,966 | Phelps | Oct. 11, 1932 |
| 1,890,848 | Fobert | Dec. 13, 1932 |
| 1,902,269 | Stoll | Mar. 21, 1933 |
| 1,903,829 | Megley | Apr. 18, 1933 |
| 2,024,715 | Bennett | Dec. 17, 1935 |
| 2,355,601 | Cudini | Aug. 8, 1944 |

FOREIGN PATENTS

| Number | Country | Date |
| --- | --- | --- |
| 122,318 | Great Britain | Jan. 23, 1919 |
| 427,219 | Great Britain | Apr. 17, 1935 |